United States Patent [19]

Placek

[11] 3,996,675
[45] Dec. 14, 1976

[54] INSTRUCTIONAL BIRTHDAY CAKE TOY

[76] Inventor: Ruth M. Placek, 1121 Hollybluff, Austin, Tex. 78753

[22] Filed: Aug. 14, 1975

[21] Appl. No.: 604,830

[52] U.S. Cl. .................................. 35/31 D; 35/72; 35/73; 46/1 R
[51] Int. Cl.² ................. G09B 23/02; A63H 33/42
[58] Field of Search ............... 35/31 R, 31 A, 31 D, 35/31 F, 34, 69, 72, 73; 46/1 R

[56]         References Cited
         UNITED STATES PATENTS

| 267,402 | 11/1882 | Bynon | 35/72 |
| 1,535,706 | 4/1925 | Wooster | 35/72 |
| 2,611,193 | 9/1952 | Davis | 35/72 X |
| 3,866,919 | 2/1975 | Powell | 35/31 D X |

Primary Examiner—William H. Grieb
Attorney, Agent, or Firm—Richards, Harris and Medlock

[57] ABSTRACT

An instructional birthday cake toy which has a recreational and educational function for children. The cake comprises various pie-wedge shaped fractional divisions to teach the concepts of fractions by forming various available combinations of pieces. Using the parts, fractions of one-half, one-third, one-fourth, one-sixth and so on can be expressed. The pieces may be placed together in various combinations on a shallow plate having various compartments to hold certain of the fractions and embossed to indicate which fraction is demonstrated. To show various combinations, two 1/6 wedges of one color, two 1/12 wedges of a different color and a remaining ½ piece of a third contrasting color are employed.

Individual letters can be readily attached to the top surface of the cake using temporary fasteners and removed to form, for example, "happy birthday" to teach familiarity with the use of letters to form words.

Artificial candles fit holes at the perimeter of the top surface of the cake to teach basic arithmetic concepts.

4 Claims, 8 Drawing Figures

INSTRUCTIONAL BIRTHDAY CAKE TOY

BACKGROUND OF THE INVENTION

A common characteristic of children is to react to pleasant experiences in their lives. From the common experience of making birthday cake mudpies as children, it can be determined that children might enjoy playing with an artificial birthday cake day after day. Such a toy might be built with many educational features in mind.

There are many instructional take-apart toys which provide educational values in a variety of ways. Young children can practice manual dexterity merely by taking the toys apart and putting them back together again. Older children may enjoy assembling and decorating the food item and then pretending to serve and eat it. This is good practice for improving table manners and to teach serving functions.

For school age children, toys teaching spelling and arithmetic are available in wide variety. Spelling one's own name and the names of friends and family can be made to come naturally in the course of play. Toys can teach counting, addition, subtraction, and fractional concepts. Instructional toys appropriate for classroom demonstrations for early grade school children are also available.

At all ages toys can reinforce the feelings of worth where this relates to events of importance. Children can also learn to share their toys with friends, imaginary or real, and learn to take turns creating importance for themselves or their friends.

An imitation cake and dish set educational toy includes a cake plate having a circular plate lip extending around the upper and outer edge defining a shallow circular cylinder having a bottom surface. A cylindrical multipiece imitation cake is sized snugly to fit into the recess formed by the lip, and formed of a plurality of pie-shaped fractional slices of a plurality of different included angles. Structure is provided with angular indicia lines inscribed on the surface of the bottom of the cylinder which correspond to the included angles. The cake surface is provided with spaced recesses to anchor decorations and lettering structure.

BRIEF DESCRIPTION OF THE DRAWINGS

For a more complete understanding of the present invention and further objects and advantages thereof, reference may now be had to the following description taken in conjunction with the following drawings, in which.

DESCRIPTION OF THE PREFERRED EMBODIMENTS

Figure 1:
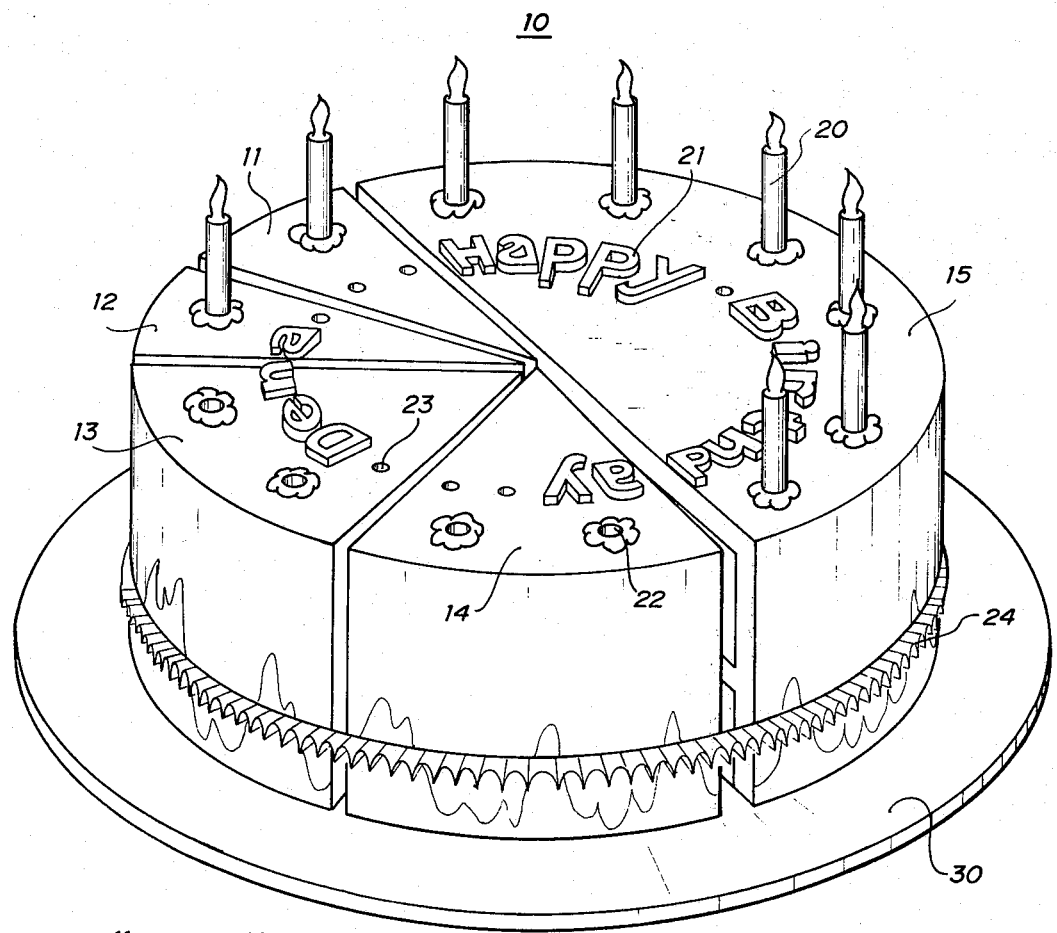
FIG. 1 is a view of a birthday cake toy embodying the invention.

Referring now to FIG. 1, five fractional pieces comprise an imitation cake toy. The two smallest slices 11 and 12 are each 1/12 of the whole. Preferably, pieces 11 and 12 are colored to simulate spice cake layers with frosting. Slices 11 and 12 will form 1/6 of the whole cake.

The next two larger slices 13 and 14 each comprise 1/6 of the whole cake. Preferably, slices 13 and 14 are colored to simulate chocolate cake to contrast with the remainder of the cake. Slices 13 and 14 will total ⅓ of the whole cake. Slices 11 and 13 will demonstrate ¼ of the whole cake.

Slice 15 represents ½ of the total cake and may be colored yellow with white frosting. Slices 11 through 14 will total ½ of the cake. The ½ piece 15 and slices 11 and 13 will demonstrate ¾ of the whole cake.

There are 12 candles 20. They may be, for example, ⅛ inch in diameter and 4 inches long. The candles may be colored like birthday cake candles but made of wood. Colored cut-out letters 21 are provided to be removable. Extra letters may be included for extra names. Cut-out flowers are applied to the surface. Holes may be drilled through various cut-out flowers 22 into the cake and used to hold the birthday cake candles. Each mounting receptacle 23 is also a hole to hold the various letters.

In the preferred embodiment, cake toy 10 may stand 3 inches high and be 8½ inches in diameter. Candles 20 add 2½ inches height when inserted. A crinkled elastic band 24 resembling a frosting band on the cake serves to hold the pieces in place when inserted into the cylindrical recess of the main serving plate 30. The cake can be made from many materials including plastic, plastic foam, laminated corrugated cardboard or wood. The realistic texture of the face of the cake may be a printed laminate.

Figure 2:
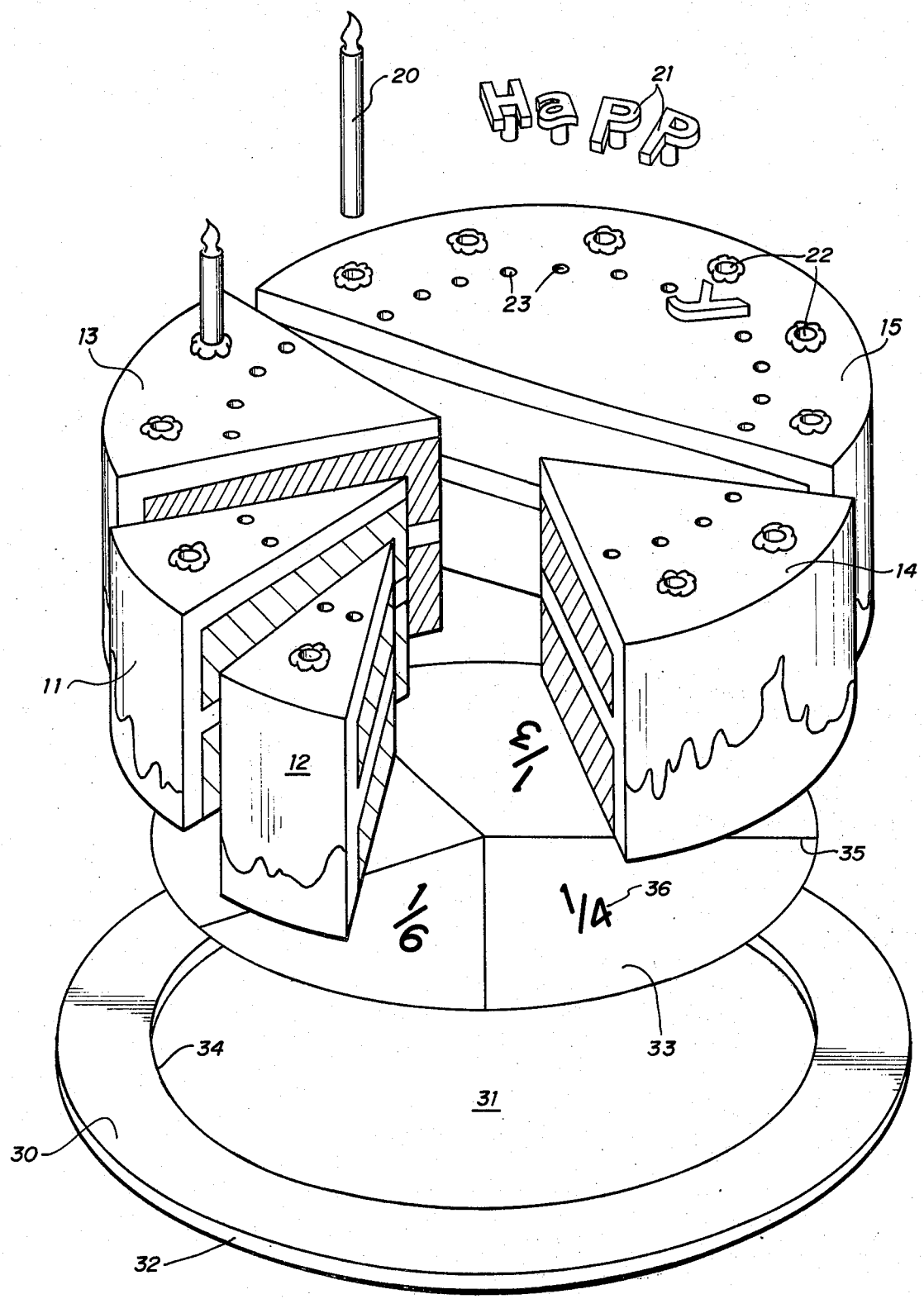
FIG. 2 is an exploded view illustrating component parts of the invention.

FIG. 2 is an exploded view of cake toy 10. Fractional pieces 11 through 15 are indicated and candles 20 are shown inserted and withdrawn from candle holes 22. Decorative letters 21 are also shown inserted and withdrawn from letter receptacles 23.

A separate plate 30 is provided with the recessed cylindrical area 31. The plate has a narrow perimeter circular plate lip 32. The two parallel planes of the plate 30 create a plate ridge 34 of sufficient height to form a cylindrical recess that will firmly hold the pieces of the cake 10 as a whole and the fractional disk 33.

Fractional disk 33 is one of many possible indicator disks. Radial marking rays 35 inscribe fractional divisions thereon. The fractional divisions correspond to individual cake pieces or combinations thereof and are indicated by fractional notation 36.

Figure 3:
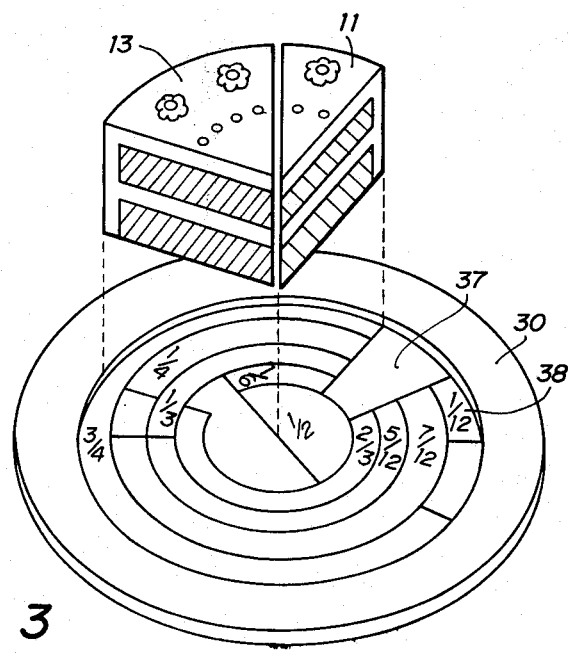
FIG. 3 is a view of an alternative method to the removable indicator disk by the use of color-coded sectional markings indicating fractional divisions on an adhesive-backed disk attached to the main serving plate.
Figure 4:
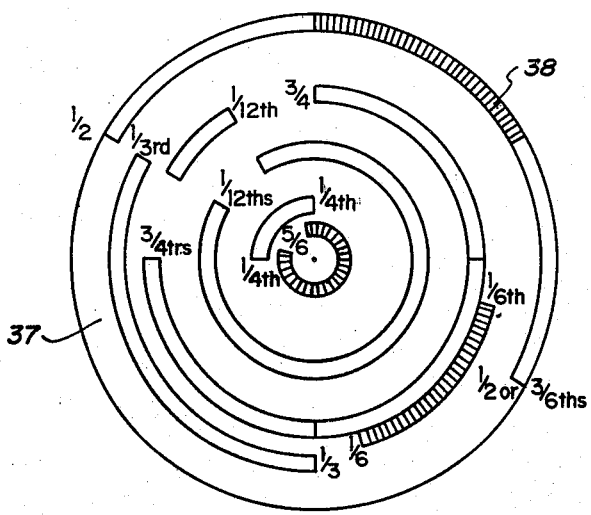
FIG. 4 is a close view of the attachable disk.

FIG. 3 embodies structure alternative to the fractional disks 33 to indicate fractional sections of the cake 10. An adhesive backed paper disk 37, shown separately in FIG. 4, may be fastened to the bottom inside of the plate. Colored lines 38 will be used to indicate possible divisions. The disk will show divisions in terms of lines and sections which correspond with cake divisions.

Figure 5:
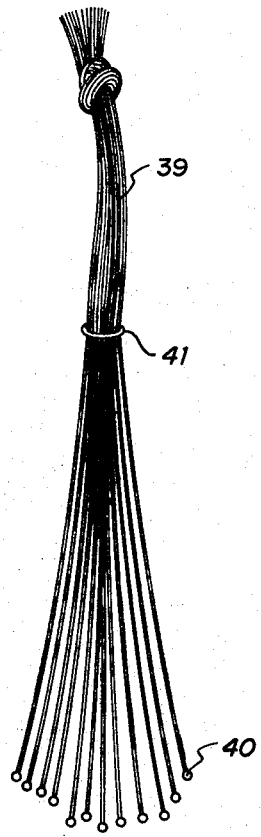
FIG. 5 is a view of string bundle designed to be used to indicate fractional divisions.
Figure 6:
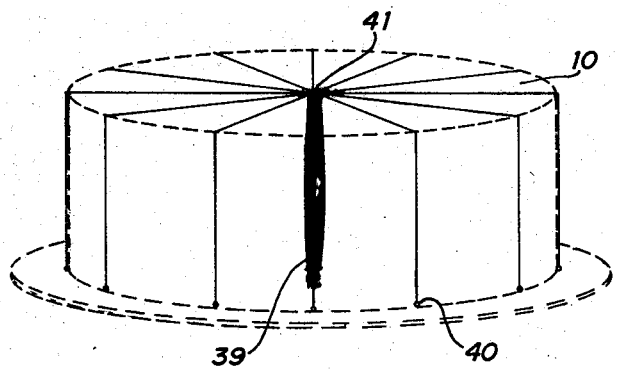
FIG. 6 shows the threading of the string bundle.
Figure 7:
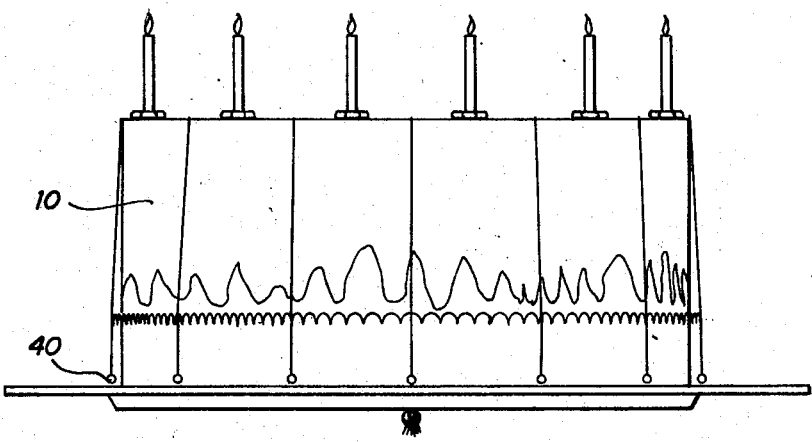
FIG. 7 is a top surface view of the imitation cake and fractional indicating markers.

In FIG. 5 a bundle of twelve black strings 39 each have a ⅛ inch bead 40 on the end of each string for weight. The bundle is encircled with a movable rubber band 41. The bundle can be optionally threaded through a hole in the center of the plate and upward through the cake toy 10 to hang over the edges as shown in FIGS. 6 and 7. Other fastening means could be used. Strings thus employed demonstrate fractions by forming lines where cuts do not exist in the cake.

Figure 8:
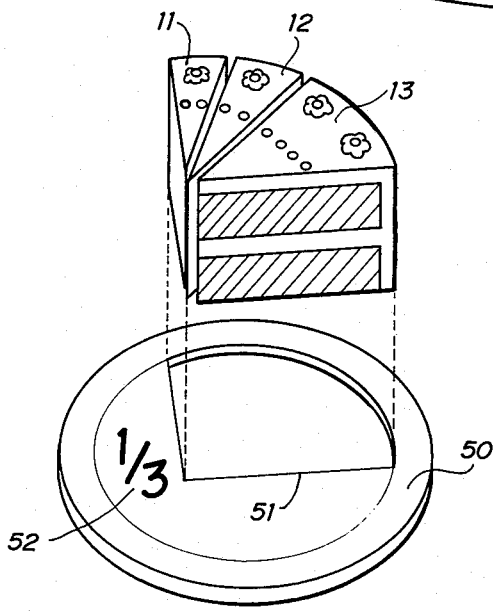
FIG. 8 is a view of a serving dish embodying the invention.

In FIG. 8, slices 11 through 13 are shown fitted in a serving dish 50. on which line 51 indicates the proper fractional area. Fractional notation 52 indicates the fractional area. The plate 50 is merely a smaller embodiment of the main plate. Various sized serving dishes may be used to indicate different portions.

Having described the invention in connection with certain specific embodiments thereof, it is to be understood that further modifications may now suggest themselves to those skilled in the art, and it is intended to cover such modifications as fall within the scope of the appended claims.

What is claimed is:
1. A combination imitation cake and dish set educational toy comprising:
 a. a cylindrical multipiece imitation cake with mounting receptacles for letters and candles and formed by a plurality of pie-shaped fractional slices defining different included angles;
 b. a plurality of artificial candles of such size and shape that they may be easily but snugly mounted in candle receiving and mounting recesses;
 c. a plurality of attachable, removable letter-shaped symbols provided with mounting studs matching the mounting receptacles provided on the upper surface of the cake and with sufficient letter symbols to spell a plurality of words;
 d. an attachable, removable garter-like elastic strap fabricated to simulate a cake decoration ring when installed around the assembled cake cylinder that actually functions to hold the assembled parts of the artificial birthday cake together;
 e. a cake plate having a circular plate lip extending around the upper and outer edge defining a shallow circular cylinder having a bottom surface sized to snugly hold the imitation cake; and
 f. a plurality of flat disks sized to fit the shallow cylinder of the cake plate and marked to indicate fractional pieces corresponding to the individual cake pieces and combinations thereof.

2. The combination imitation cake and dish set educational toy described in claim 1 together with serving dishes marked to indicate fractional divisions corresponding to individual cake pieces or combinations thereof.

3. The combination imitation cake and dish set educational toy described in claim 1 together with an adhesive-backed disk marked with color-coded lines to indicate fractional divisions of the imitation cake and sized to fit the shallow cylindrical recess of the main cake plate so as to serve as the removable disks of claim 1.

4. The combination imitation cake and dish set educational toy described in claim 1 together with a bundle of strings capable of being threaded through the center of the imitation cake toy and hung or fastened over the surface of the cake in order to indicate fractional divisions.

* * * * *